(12) United States Patent
Squyres et al.

(10) Patent No.: US 7,578,644 B2
(45) Date of Patent: Aug. 25, 2009

(54) DECKING BEAM END PIECE

(75) Inventors: Jerrell P. Squyres, Dallas, TX (US); Kelly Lee Miller, Grand Saline, TX (US)

(73) Assignee: JPS Corporation, Dallas, TX (US)

( * ) Notice: Subject to any disclaimer, the term of this patent is extended or adjusted under 35 U.S.C. 154(b) by 0 days.

(21) Appl. No.: 11/776,949

(22) Filed: Jul. 12, 2007

(65) Prior Publication Data

US 2009/0016841 A1 Jan. 15, 2009

(51) Int. Cl.
*B60P 7/08* (2006.01)

(52) U.S. Cl. .................. 410/89; 410/143; 410/144; 410/149

(58) Field of Classification Search .............. 410/89, 410/143–145, 149, 150; 248/354.1, 354.5; 211/105.3, 105.5, 105.6
See application file for complete search history.

(56) References Cited

U.S. PATENT DOCUMENTS

| | | | |
|---|---|---|---|
| 3,836,174 A | * | 9/1974 | Holman, Jr. ................. 410/149 |
| 4,079,677 A | | 3/1978 | Vandergriff et al. |
| 5,104,269 A | | 4/1992 | Hardison |
| 5,338,137 A | | 8/1994 | Jensen |
| 5,941,667 A | | 8/1999 | Hardison |
| 6,739,811 B1 | * | 5/2004 | Petelka ................. 410/89 |
| 6,824,341 B2 | | 11/2004 | Ehrlich |
| 6,895,867 B1 | | 5/2005 | Burrows |
| 7,134,820 B2 | | 11/2006 | Ehrlich |

\* cited by examiner

*Primary Examiner*—Stephen Gordon
(74) *Attorney, Agent, or Firm*—Carstens & Cahoon, LLP; Vincent J. Allen

(57) ABSTRACT

Disclosed is an improved decking beam end assembly for supporting a removable second deck in a cargo container, such as a truck trailer or a rail car. In one aspect, the improved end assembly is less likely to be damaged during use since the spring is well protected by being surrounded by other parts. In one aspect, the improved end assembly has no latch protrusions and can be more easily removed a slotted track due to the axial, non-pivoting spring loaded latch mechanism.

5 Claims, 2 Drawing Sheets

DECKING BEAM END PIECE

BACKGROUND OF THE INVENTION

1. Technical Field

The present invention relates to a decking beam for supporting a removable second deck in a cargo container, such as a truck trailer, and, more particularly, to an improved decking beam end piece that is less likely to be damaged during use due to its design.

2. Description of Related Art

Because it is often desirable to carry cargo as two-tiered or double-decked loads, decking beams are often utilized, generally in truck trailers and in rail cars, to support a removable second deck on which relatively light-weight cargo can be transported. The prior art is replete with examples of such decking beams, as illustrated by U.S. Pat. Nos. 4,079,677, 5,104,269, 5,338,137, 5,941,667, and U.S. Pat. No. 6,895,867. There is, however, an ever increasing need to provide decking beam end pieces which can be secured to slots in a container wall with minimal damage to the decking beam end piece over time. For example, U.S. Pat. No. 4,079,677 discloses an end piece having a finger latch 106 as best depicted by FIG. 8 that extends upwardly from the body section of the beam. This protrusion, however, is undesirable as this finger latch 106 can be damaged if it is stepped on, caught in pieces of equipment, or dropped. Any of these occurrences can cause the body section 104 to tear away from the end piece. Thus, such configuration often requires frequent repair. Consequently, the need exists for an improved decking beam end piece which minimizes the protrusions extending therefrom.

Other decking beams, such as the one disclosed by U.S. Pat. No. 6,895,867 has a keeper 11 pivotally mounted by means of a bolt 13 and nut 14 to the end of the beam. Unfortunately, because this assembly is exposed and has not protective casing, it is easily and often damaged and, as a result, the manufacturer advertises a replacement channel assembly to permit users to complete the necessary repairs which are, as evidenced by their replacement kit apparently frequently required.

Another drawback of prior art end pieces can be illustrated by reference to U.S. Pat. No. 5,338,137 and U.S. Pat. No. 5,941,667, which require a pivotally supported latching member. One problem with such devices is that they require a latching member to move in a vertical direction, which makes it more difficult to release the beam and/or latch from the slot from which it is attached. Consequently, a need exists for an end beam latch assembly and an improved decking end piece that overcomes the deficiencies in the prior art outlined above.

SUMMARY OF THE INVENTION

The present invention comprises a cargo beam end assembly for attaching an elongated beam to a slotted track. In one embodiment, the assembly comprises an elongated I-beam comprising a substantially flat top section, a spring-loaded beam end locking slider movable only in an axial direction. In one embodiment, the locking slider further comprises a substantially flat top having no protrusions. In one aspect, the beam end assembly the top and/or bottom of the locking slider is recessed from top and bottom of I-beam. The above as well as additional features and advantages will become apparent in the following written detailed description.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
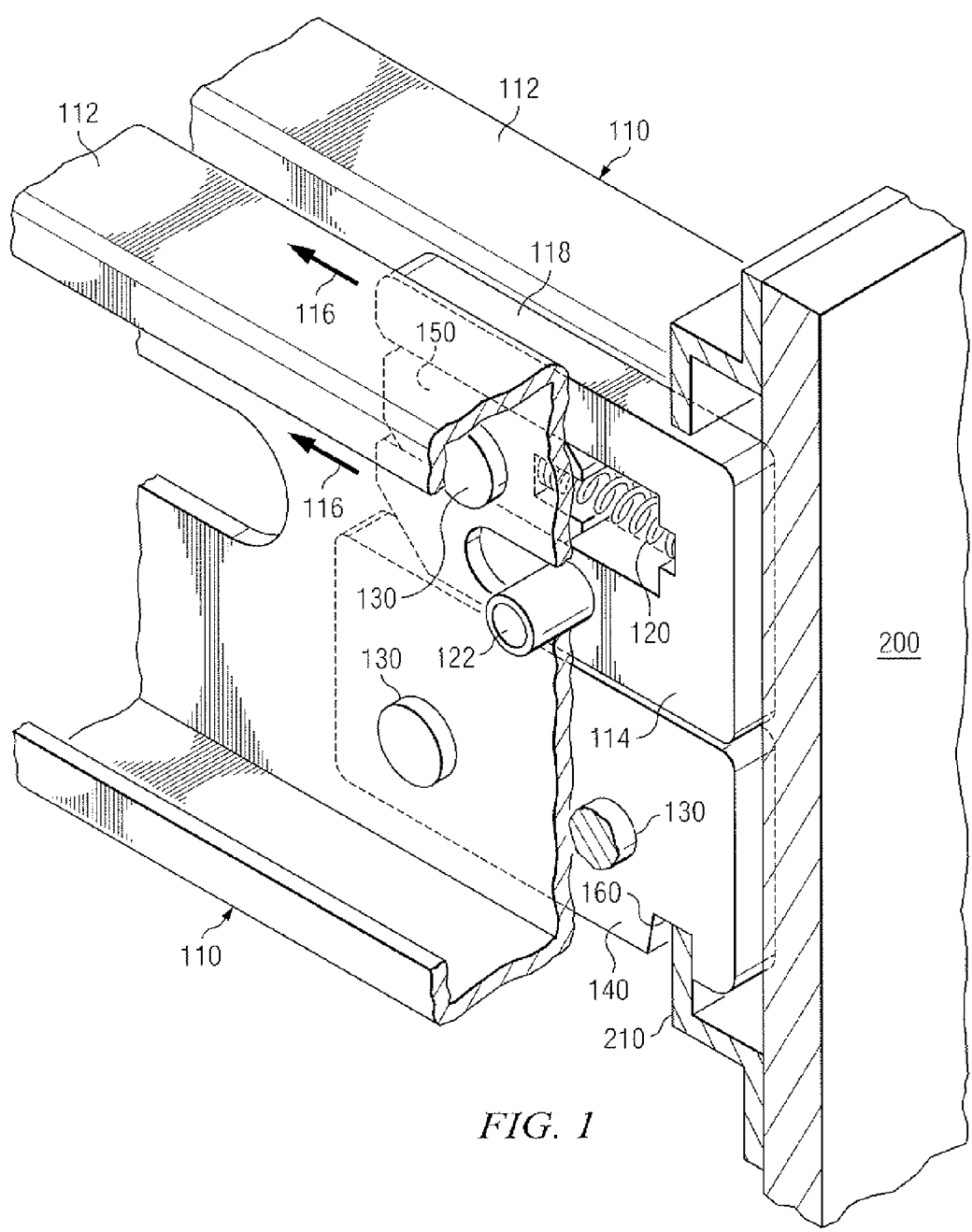
FIG. 1 is a partial cutaway perspective view of the improved decking beam end piece in accordance with one embodiment of the present invention.

FIG. 1 is a cutaway perspective view of the improved decking beam end piece in accordance with one embodiment of the present invention. Depicted in FIG. 1 is an elongated I-beam 110 comprising a substantially flat top section 112, a spring-loaded beam end locking slider 114 that is movable only in the axial direction as indicated by arrows 116, and a beam end spacer 140 directly below the beam end locking slider 114. The beam end spacer 140 is preferably in the stationary position and is secured into place with rivets 130. In one embodiment, the beam end spacer 140 comprises a receiving slot 160 for placement into a track 210 that is attached to a wall 200. The track 200 comprises a plurality of slots (not shown) for placement of the end beam assembly. A track 200 having such slots are well known in the prior art as illustrated by numerals 20 and 20a of FIG. 1 of U.S. Pat. No. 6,895,867.

Referring again to FIG. 1 of the present invention, the locking slider 114 advantageously comprises a flat top 118 having no upward facing protrusions. In one embodiment, the flat top 118 of the locking slider 114 is recessed slightly in elevation from the flat top section 112 of the elongated I-beam 110. Such recess advantageously protects the locking slider 114 and the locking slider 114 is less likely to be damaged if the beam assembly is thrown onto the floor, stepped on, or, if various pieces of cargo cause rough physical contact to the beam end assembly. Similarly, in one embodiment, the bottom of the beam end spacer 140 is slightly recessed in elevation from the flat bottom section of the I-beam 110.

A coiled spring 120 is disposed between a beam end slider spacer 150, secured into position by a rivet 130, and the beam end locking slider 114. The coiled spring is advantageously bounded on the sides by I-beam 110.

Figure 2A:
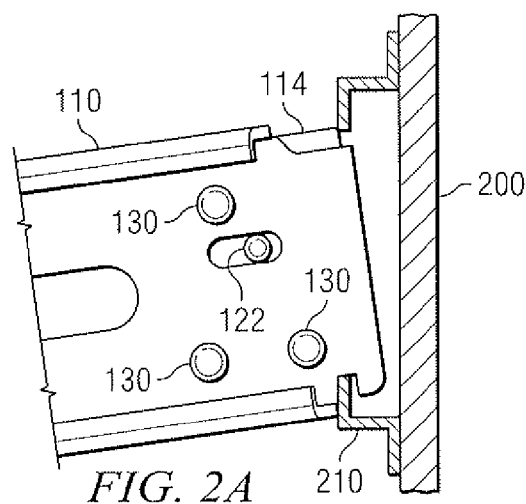
FIG. 2a is a side view of the improved decking beam end piece in a partially mounted position.
Figure 2B:
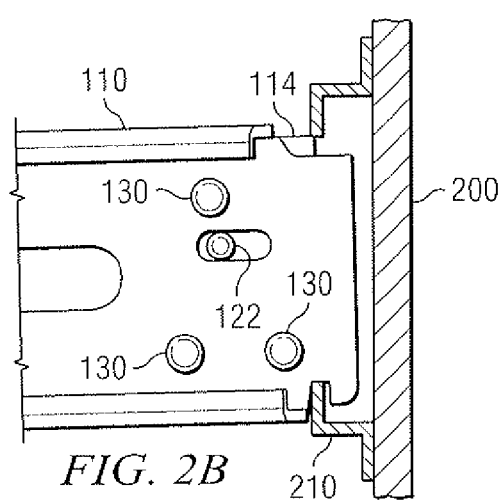
FIG. 2b is a side view of the improved decking beam end piece with the slider in the depressed position, in accordance with one embodiment of the present invention.

FIG. 2a is a side view of the improved decking beam end piece in a partially mounted position. FIG. 2b is a side view of the improved decking beam end piece with the slider in the depressed position, in accordance with one embodiment of the present invention. Referring to FIGS. 1, 2a, and 2b, to attach the decking beam end piece to the track 210 attached to a wall 200, the slider pin 122 is pushed in the axial direction, as indicated in the arrows 116 to move the spring-loaded beam end locking slider 114 away from the wall 200. Once the beam end locking slider has been depressed and the receiving slot 160 has been placed into the bottom of the track 210, the I-beam 110 can be brought to a substantially horizontal direction, as shown in FIG. 2b, and the slider pin 122 can be released. The coiled spring 120 causes the beam end locking slider 114 to move in the direction towards the wall 200 and the cargo beam end assembly will be locked into place as shown in FIG. 2c.

Figure 2C:
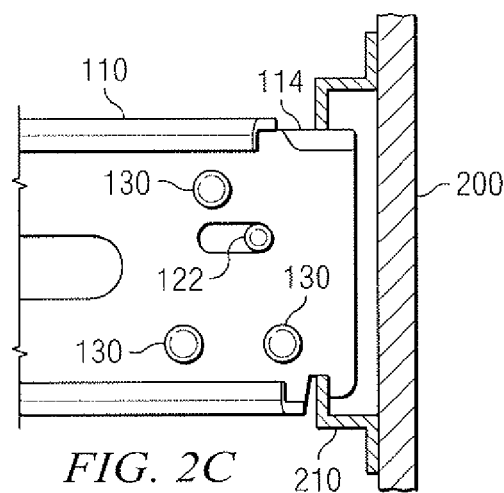
FIG. 2c is a side view of the improved decking beam end piece in the mounted position in accordance with one embodiment of the present invention.

To removed a beam end assembly locked into place, as depicted by FIG. 2c, the slider pin 122 is pushed in the axial direction, as indicated in the arrows 116 (as depicted in FIG. 1) to move the spring-loaded beam end locking slider 114 away from the wall 200. The beam end assembly can then be angled as shown in FIG. 2b and the receiving slot 160 can be removed from the track 210.

There are several advantages various embodiments of this invention provides over the prior art. One advantage is that the number of protruding parts is substantially minimized. There is no finger latch that protrudes from the assembly and the recessed beam end locking slider 114 is well protected within the I-beam 110. Another advantage over the prior art is that, because the spring-loaded beam end locking slider 114 is moveable only in the axial direction, the beam end locking slider 114 facilitates the easy removal of the cargo beam end assembly from the slot 210. For example, and referring to FIG. 2c, when the slider pin 122 is moved in the axial direction, the beam end locking slider 114 also moves only in the horizontal direction. This is unlike many embodiments disclosed in the prior art which require a pivotal latching member, which, when disengaged, necessarily creates a vertical force component up against the top section of the track. Such vertical force component makes it more difficult to move the I-beam from the slotted track. Consequently, the prior art can require beveled latches in an attempt to minimize the vertical force placed on the slot. However, a beveled latch increases costs and a vertical force is still necessarily imparted onto the top portion of the slot when one attempts to disengage the latch.

The present invention provides an improved cargo beam end assembly for attaching an elongated beam to a slotted track. The design of the present invention is such that the assembly requires little, if any, repair. Any repair required would likely be related to a relatively easy to fix slider pin 122, since the slider pin 122 is the only member protruding from the decking beam end piece assembly. Further, because the coiled spring 120 is inside the I-beam 110, it will not become dislodged, even if substantial amounts of force are placed upon it from the end assembly being dropped onto the ground or from being hit by various tools or pieces of cargo. The cargo beam end assembly of the present invention is easy to both attach and detach from the wall, since the beam end locking slider 114 moves only in the axial direction.

While this invention has been particularly shown and described with reference to the preferred embodiment, it will be understood by those skilled in the art that various changes in form and detail may be made therein without departing from the spirit and scope of the invention.

What is claimed is:

1. A cargo beam end assembly for attaching an elongated beam to a
    slotted track, said assembly comprising:
    an elongated I-beam (110) comprising:
        a substantially flat top section (112) located proximal to a first end of said elongated I-beam;
        a spring-loaded beam end locking slider (114) movable only in an axial direction (116) and disposed between a first wall and a second wall of said I-beam below said substantially flat top section (112) for engaging said slotted track,
        wherein said locking slider (114) is positioned such that no portion of said locking slider extends above said substantially flat top section (112) when said locking slider is engaged in said slotted track.

2. The beam end assembly of claim 1 wherein said locking slider (114) is recessed from said flat top section (112) of said I-beam (110).

3. The beam end assembly of claim 1 further comprising a beam end spacer (140) disposed adjacent said beam end locking slider (114).

4. The beam end assembly of claim 3 wherein said beam end spacer (140) is stationary relative to said elongated beam.

5. The beam end assembly of claim 4 further comprising a beam end slider spacer (150) secured to said elongated beam for engaging a slot in said beam end locking slider (114).

* * * * *